United States Patent [19]
Williams

[11] Patent Number: 5,346,519
[45] Date of Patent: Sep. 13, 1994

[54] FILTER MEDIA CONSTRUCTION

[75] Inventor: Roger D. Williams, Dallas, N.C.

[73] Assignee: Pneumafil Corporation, Charlotte, N.C.

[21] Appl. No.: 53,602

[22] Filed: Apr. 27, 1993

[51] Int. Cl.⁵ .................. B01D 27/06; B01D 29/07
[52] U.S. Cl. ........................ 55/489; 55/497; 55/500; 55/521
[58] Field of Search ............ 55/486, 488, 489, 493, 55/497, 498, 521

[56] References Cited

U.S. PATENT DOCUMENTS

| | | | |
|---|---|---|---|
| 1,077,181 | 10/1913 | Winborn | 55/521 X |
| 1,639,133 | 8/1927 | Greene | 55/498 |
| 2,019,186 | 10/1935 | Kaiser | 55/521 X |
| 2,135,863 | 11/1938 | Walker | 55/521 X |
| 2,784,802 | 3/1957 | Bub et al. | 55/521 |
| 2,836,302 | 5/1958 | Buckman | 55/521 X |
| 2,908,350 | 10/1959 | Buckman | 55/521 X |
| 2,936,855 | 5/1960 | Allen et al. | 55/521 X |
| 2,945,559 | 7/1960 | Buckman | 55/500 |
| 2,968,361 | 1/1961 | Buckman | 55/500 X |
| 3,198,336 | 8/1965 | Hyslop | 55/521 X |
| 3,531,920 | 10/1970 | Hart | 55/497 |
| 3,633,756 | 1/1972 | Buckman | 55/498 X |
| 3,799,354 | 3/1974 | Buckman et al. | 55/521 X |
| 4,102,792 | 7/1978 | Harris | 55/521 X |
| 4,268,290 | 5/1981 | Barrington | 55/521 |
| 4,452,619 | 6/1984 | Wright et al. | 55/521 |
| 4,615,804 | 10/1986 | Wright | 55/521 X |
| 4,732,678 | 3/1988 | Humbert, Jr. | 55/521 X |
| 5,066,400 | 11/1991 | Rocklitz et al. | 55/521 X |

FOREIGN PATENT DOCUMENTS

| | | | |
|---|---|---|---|
| 2034670 | 1/1972 | Fed. Rep. of Germany | 55/521 |
| 1030447 | 6/1953 | France | 55/521 |

Primary Examiner—Robert Spitzer
Attorney, Agent, or Firm—Shefte, Pinckney & Sawyer

[57] ABSTRACT

Filter media used for removing foreign matter from an air stream flowing therethrough, which includes a pair of first and second generally flat sheets of filtering material extending in generally parallel relation to one another with a spacing therebetween. The first and second sheets are each formed with a plurality of dimples extending, respectively, inwardly toward the other of the sheets for abutment therewith to maintain the spacing between the sheets, and the dimples in one of the sheets are spaced from one another along the extending length thereof and are also spaced from the corresponding dimples in the other sheet, with such spacing preferably being equal. Also, adjacent pairs of such filter media sheets are arranged so that the dimples in the facing surfaces of adjacent pairs are offset from one another whereby clumps of foreign matter do not tend to collect and become anchored in opposed crevices formed by the dimples.

3 Claims, 3 Drawing Sheets

FILTER MEDIA CONSTRUCTION

BACKGROUND OF THE INVENTION

The present invention relates generally to filter media construction, particularly construction wherein the filter media has a generally flat configuration for use in panel filters or any similar application where flat filter surfaces are required.

In a typical conventional flat filter media construction, a series of pairs of generally flat sheets of a suitable filtering material (e.g. paper) are mounted in spaced, parallel relation to one another to leave a spacing between the facing surfaces of each such pair of sheets, and the two sheets in each such pair are also spaced from one another to provide an interior spacing therebetween. An air stream having foreign matter entrained therein is caused to flow into the spacings between adjacent pairs of filter sheets, then inwardly through the facing surfaces of each adjacent pair of filter sheets to the interior spacing thereof, whereby the foreign matter is deposited on such facing surfaces, and the cleaned air is caused to flow away from the interior spacing of each pair of sheets.

Because the sheets of filter media are generally made of a flexible material such as paper, and because the aforesaid air flow through the filter media creates a pressure drop across the sheets, the two sheets in each pair of sheets tend to collapse toward one another, which can reduce or even eliminate the required spacing therebetween that forms the aforesaid clean air interior area between the sheets. Similarly, since each pair of sheets is located in close proximity to the adjacent pairs, the flexing movement of the filter media can also result in a significant reduction in the aforesaid spacing between the facing surfaces of adjacent pairs of filter sheets thereby reducing the size of the area between the pairs of filter sheets that is necessary for receiving the dirty air with entrained foreign matter.

To avoid these problems, conventional filter media constructions incorporate in each of the filter media sheets a plurality of dimples or indentations that are arranged in a predetermined pattern to maintain the desired spacing not only between the two sheets in each pair, but also the facing sheets of adjacent pairs. More specifically, the two sheets in each pair both include inwardly directed dimples, and the dimples in both sheets are located directly opposite one another so that if the two sheets tend to collapse toward one another, the opposed dimples can abut one another and maintain the desired spacing between the sheets. Similarly, the outwardly facing surfaces of each pair are formed with outwardly directed dimples, and such dimples in one pair are located directly opposite the corresponding outwardly projecting dimples in the facing surfaces of an adjacent pair to maintain, in a similar manner, the dirty air spacing between adjacent pairs of filter media sheets.

In typical known filter media constructions, the inwardly directed dimples in each sheet alternate with the outwardly directed dimples so that the inwardly directed dimples in the facing surfaces of adjacent pairs are opposite one another, as are the outwardly directed dimples. While this media construction effectively solves the problem of maintaining the desired spacings as described above, it also results in significant drawbacks in some filtering applications of the filter media.

For example, where the foreign matter to be filtered is somewhat large in particulate size, such as the textile waste material that becomes entrained in the ambient air in textile mills and the like, the opposed inwardly facing dimples in the facing surfaces of adjacent pairs form opposed crevices that tend to collect clumps of foreign matter therebetween, and the opposed crevices at each end of the clump tend to anchor the clump in place so as to make it very difficult to remove the clump using traditional filter cleaning systems (e.g. pressurized air directed against the filter surfaces to be cleaned). Additionally, the opposed inwardly directed dimples in each pair of filter media sheets can, in some filtering applications, result in a larger interior spacing between the sheets than is required, which will result in an unnecessary increase in the size and expense of the overall filtering apparatus which normally consist of a substantial number of adjacent pairs of filter media sheets.

The present invention provides a filter media construction that avoids the aforesaid drawbacks of conventional filter media constructions.

SUMMARY OF THE INVENTION

In accordance with the present invention, a filter media construction is provided for use in removing foreign matter from an air stream flowing therethrough. The filter media construction comprises a pair of first and second generally flat sheets of filtering material extending in generally parallel relation to one another with a spacing therebetween whereby the air stream can flow through said first and second sheets to the spacing therebetween, while depositing the foreign matter on the outwardly facing surfaces of the first and second sheets and allowing the clean air in the spacing between the sheets to be withdrawn therefrom. The first and second sheets are each formed with a plurality of dimples extending, respectively, inwardly toward the other of said sheets for abutment therewith to maintain the desired spacing between the two sheets, and the dimples in one of the sheets are spaced from one another along the extending length of such sheet and are also spaced from the corresponding dimples in the second sheet. Accordingly, the inwardly directed dimples in the two sheets of each pair do not abut one another and they thereby avoid the drawback of unnecessarily increasing the spacing between the filter media sheets as discussed above. Preferably, the inwardly directed dimples in one sheet are spaced an equal distance from the dimples in the other sheet, thereby providing a good spacing of the dimples to properly prevent any collapse of one sheet toward the other.

Since, as discussed above, most filtering applications require a substantial number of pairs of filter media sheets disposed in spaced parallel relation to one another, a further feature of the present invention comprises locating the dimples in one of the facing surfaces of two adjacent pairs of sheets of filter media offset from the inwardly directed dimples in the other facing surface, whereby the crevices formed by such inwardly directed dimples are never located directly opposite one another and they, therefore, do not tend to collect and anchor clumps of foreign matter therebetween, as is the case in conventional filter media applications discussed above.

DESCRIPTION OF THE PREFERRED EMBODIMENT

Figure 1:
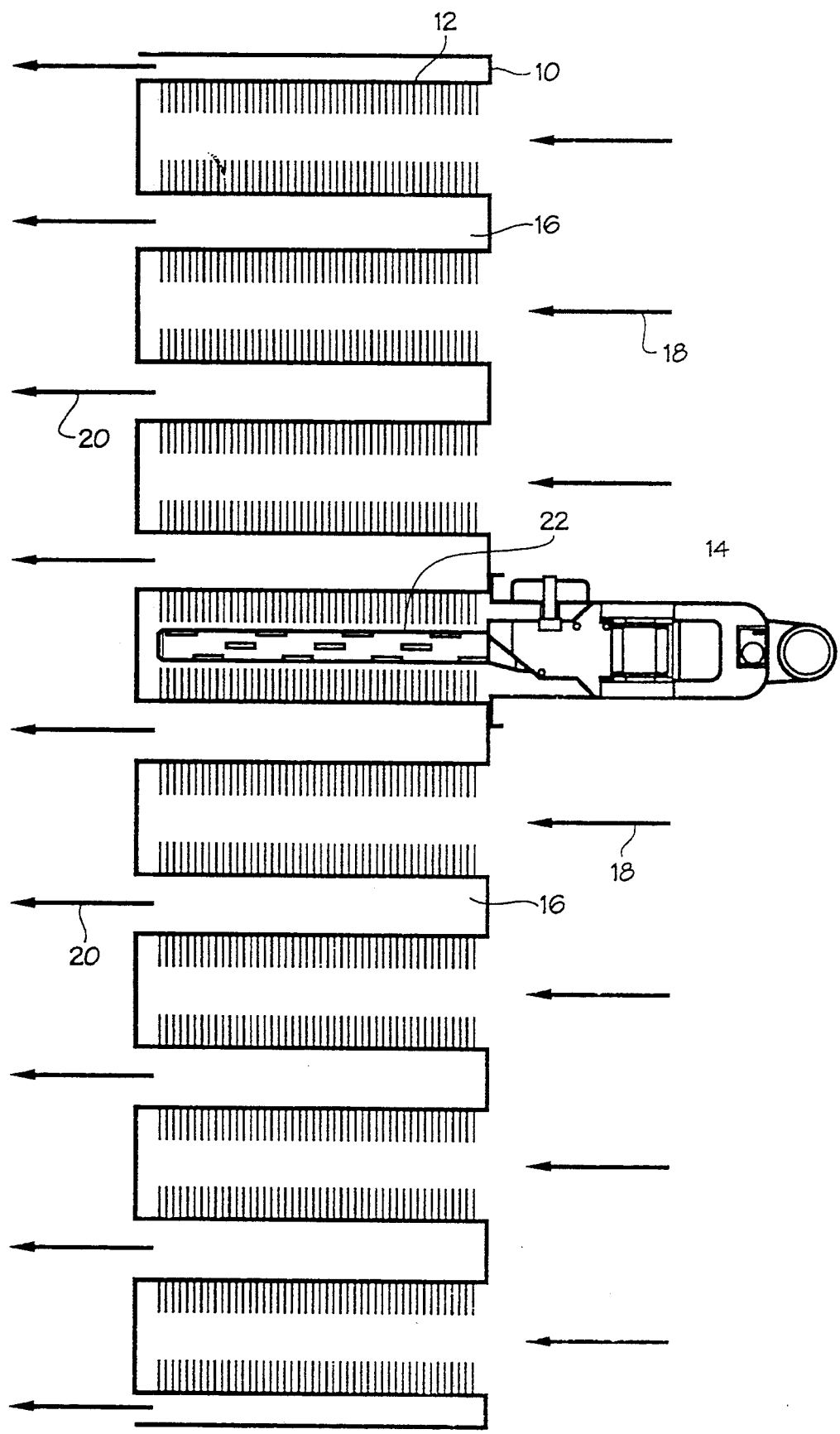
FIG. 1 is a plan view diagrammatically illustrating the arrangement of a plurality of filter media panels located in a housing, and a movable filter cleaning device for cleaning such filter media panels.

Looking now in greater detail at the accompanying drawings, FIG. 1 is a plan view which illustrates a typical industrial filtering application in which a filter media construction according to the present invention is particularly useful, but it is to be understood that such filter media construction is not limited to any particular application. In FIG. 1, a filter housing 10 has mounted therein a plurality of pairs of filter media panels 12 in an array that would typically extend all the way across a large compartment or room, with the filter media panels 12 in cooperating pairs that face one another. A filter cleaning device, generally indicated by the reference numeral 14, is provided for cleaning foreign matter which is deposited on the outer surfaces of the filter media panels as dirty air flows through the filter media panels to the clean air compartments 16 behind the filter media panels 12 as indicated by the flow arrows in FIG. 1. The details of the construction and arrangement of the filter housing 10, and the operation of the filter cleaning device 14, form no part of the present invention, and such details are set forth co-pending U.S. patent application Ser. No. 08/053,470, which is incorporated herein by reference.

Figure 2:
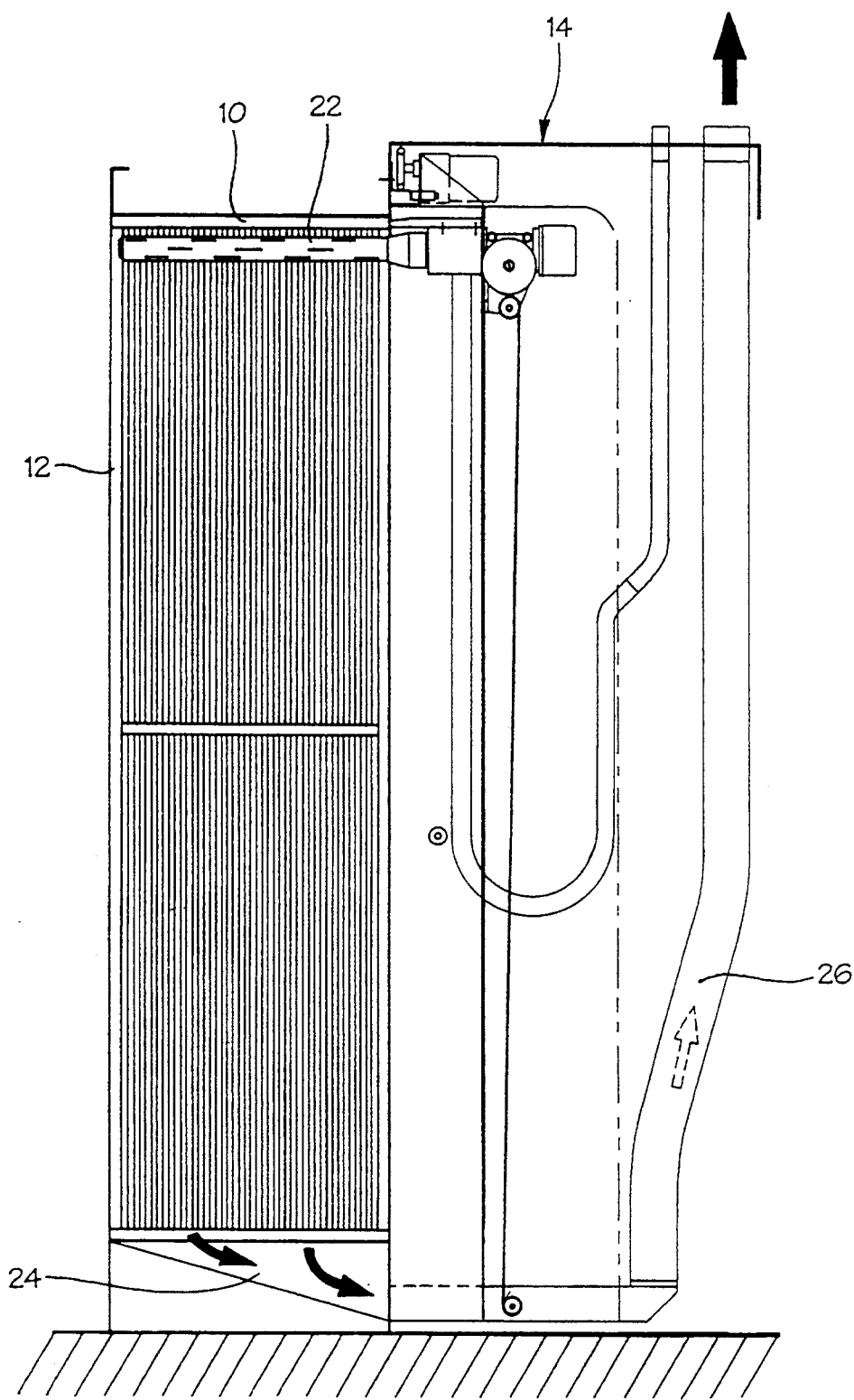
FIG. 2 is a side elevation view showing the filter media panels and the filter cleaning device.

However, a brief summary of the construction and operation of the filter housing 10 and the filter cleaning device 14 will assist in understanding the present invention. As indicated above, the dirty air, indicated by flow arrows 18 in FIG. 1, passes through the filter media in the filter panels 12 to the clean air compartment 16 and out of the filter housing 10 as indicated by the flow arrows 20, thereby depositing foreign matter entrained in the air stream on the outer surfaces of the filter media. The filter cleaning device 14 is arranged for movement along the adjacent pairs of filter panels 12, and includes a rotating nozzle 22 that is positioned directly between each adjacent pair of filter panels so as to cause a pressurized flow of clean air to be emitted from the nozzle to dislodge the foreign matter collected on the outer surfaces of the filter media. Also, as best shown in FIG. 2, the nozzle 22 is mounted for vertical movement along the surfaces of the filter media panels 12, and the housing of the cleaning device 14 cooperates with the filter housing 10 to seal the particular filtering cell being cleaned by the cleaning device 14, and the lower end of each such cell has an outlet opening 24 connected to a suction hose 26 that withdraws air from the filtering cell as it is being cleaned. Thus, the cleaning device 14 sequentially moves along the filtering cells consisting of opposed filter panels 12, and stops at each filtering cell in sequence. When the cleaning device 14 stops, the filtering cell is sealed, and the rotating nozzle 22 is caused to move vertically upwardly and downwardly across the outer surfaces of the filter media while directing pressurized air thereagainst to dislodge the foreign matter deposited thereon, and, simultaneously, the vacuum created at the outlet 24 results in the dislodged foreign matter being carried away from the filtering cell, all as explained in greater detail in the aforesaid co-pending patent application.

Figure 3:
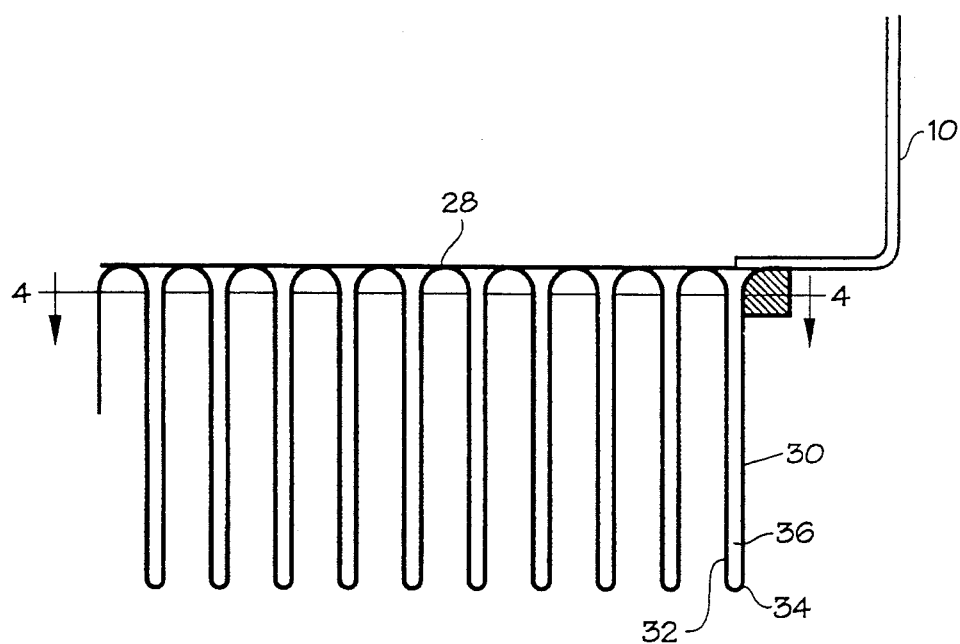
FIG. 3 is a detailed view illustrating the sinuous configuration of the filter media.

FIG. 3 is a detailed plan view of a portion of one of the filter media panels 12 which is mounted in the filter housing 10. Each filter media panel 12 includes a perforated sheet 28 that is mounted directly to the side walls of the filter housing 10. Secured to the perforated sheet 28 is a pleated filter media 30, preferably a pleated paper filter media of the type typically used in many industrial air filter devices, which extends in a generally flat plane parallel to the perforated sheet 28, but which is also formed with a sinuous configuration as best seen in FIG. 3. This sinuous configuration results in a plurality of spaced pairs of a first sheet 32 and a second sheet 34, both of which are generally flat and extend in generally parallel relation to one another with a spacing 36 therebetween whereby the air stream described above can flow through the first and second sheets 32,34 to the spacing 36 and to the clean air compartment 16, thereby depositing foreign matter on the outwardly facing surfaces of the first and second sheets 32,34, as best seen in FIG. 4.

As discussed above, the flow of air through the first and second sheets 32,34, and the pressure differential thereacross, tend to move the first and second sheets 32,34 toward one another and eliminate the spacing 36 therebetween unless some provision is made to prevent the collapsing effect. In accordance with the present invention, and as best seen in FIG. 4, each of the first and second sheets 32,34 are formed with a plurality of dimples or indentations 38 which extend, respectively, inwardly toward the other of said sheets for abutment therewith to maintain the spacing 36 between the sheets 32,34. The dimples 38 in the first sheet 32 are spaced from one another along the extending length of the first sheet, and the dimples 38 in the first sheet 32 are also spaced from the corresponding dimples 38 in the second sheet 34. Preferably, the dimples 38 in the first and second sheets 32,34 are equally spaced from one another, and alternate as illustrated in FIG. 4. Additionally, as also best seen in FIG. 4, the adjacent pairs of first and second sheets 32,34 are arranged so that the dimples 38 formed in the facing surfaces of each two adjacent pairs of first and second sheets 32,34 are offset from one another so that the crevices formed by the dimples 38 in such facing surfaces are never directly opposite to one another.

Figure 4:
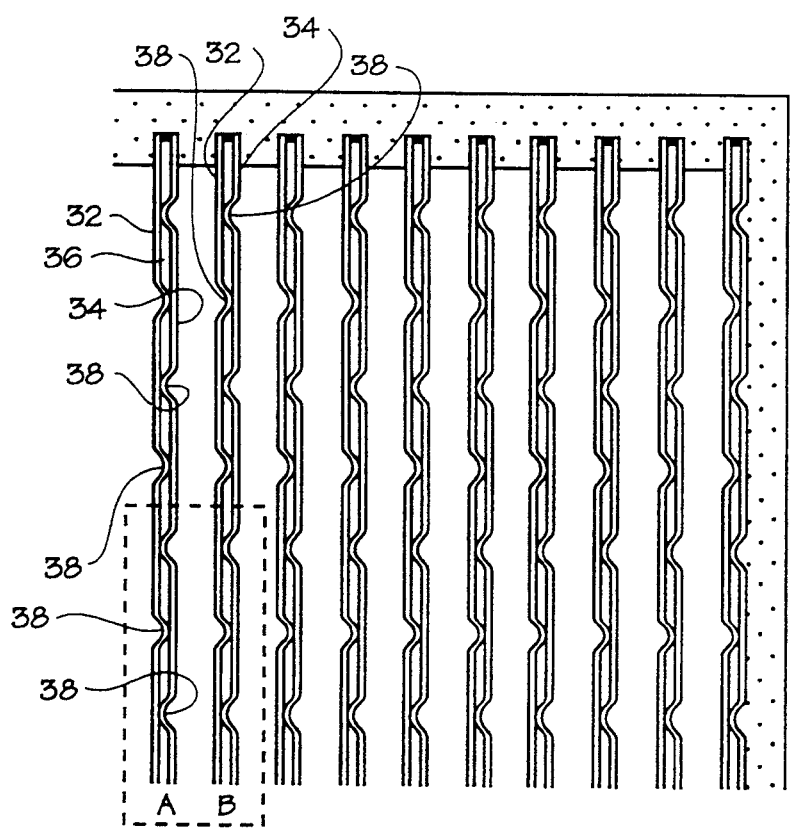
FIG. 4 is a sectional view taken along lines 4—4 in FIG. 3.

The significance of the aforesaid pattern of the dimples 38 may be best understood by reference to the particular pattern reflected in the dotted-line box in FIG. 4 where two adjacent pairs of first and second sheets 32,34 are indicated by reference letters A and B, respectively. Within the dotted-line box, it will be noted that the second sheet 34 in pair A has two inwardly extending dimples 38 that abut the flat inner surface of the first sheet 32, and the dimple 38 in the first sheet 32 in pair A likewise abuts the inner surface of the second sheet 34 and it is located equidistant from the two dimples 38 in the second sheet 34. By virtue of this arrangement, the dimples provide a desired stiffening for the first and second sheets 32,34, and with the equal spacing between the alternating dimples 38 provides a suitable means for maintaining the spacing 36 between the first and second sheets 32,34 along the entire extending length of the pair A. The dimple arrangement in pair B is identical to that in pair A, and it will be noted that the crevices formed by the dimples 38 in the outer face of second sheet 34 in pair A are located opposite to the flat surface at the outer face of the second sheet 34 in pair B, and the crevices formed by the dimples 38 in the first sheet 32 in pair B are located opposite to a flat portion of the second sheet 34 in pair A. By virtue of this arrangement, the problem encountered in typical known filter media constructions described above, namely the problem of clumps of foreign matter tending to bridge across the facing surfaces of adjacent pairs of filter media sheets and becoming anchored in two facing crevices, is avoided since the crevices in the facing surfaces of adjacent pairs of filter media sheets in the present invention are never opposite to one another and are, rather, substantially spaced from one another.

It will also be noted that the alternating pattern of dimples 38 in the first and second sheets 32,34 of each pair of sheets results in a reduction of the width of the pair as compared with the known filter media constructions described above. More specifically, in the known constructions, the dimples in both the first and second sheets are located opposite one another so as to abut one another, which, as compared with the construction shown in FIG. 3, would double the width of the spacing 36 between the first and second sheets 32,34. This doubling of the width of each pair of first and second sheets will substantially increase the size of each pair of filter media sheets, and will therefore substantially increase the overall size of the filter housing itself because, as seen in FIG. 1, there are a large number of adjacent pairs of sheets, and a doubling of the size of each pair will require a much larger filter housing to accommodate the same filtering area presented by the filter media sheets.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. Filter media for use in removing foreign matter from an air stream flowing therethrough, said filter media comprising first and second generally flat sheets of filtering material extending in generally parallel relation to one another with a spacing therebetween, said first and second sheets forming a first filter pair whereby said air stream can flow through said first and second sheets to said spacing therebetween while depositing said foreign matter on the outwardly facing surfaces of said first and second sheets, said first sheet being formed with a plurality of dimples spaced from one another along the extending length of said first sheet and projecting across said spacing to abut said second sheet, and said second sheet being formed with a plurality of dimples spaced from one another along the extending length of said second sheet and projecting across said spacing to abut said first sheet, said dimples in said first sheet being spaced from said dimples in said second sheet.

2. Filter media as defined in claim 1 wherein each of said dimples in said first sheet are spaced an equal distance from the dimples in said second sheet.

3. Filter media as defined in claim 1 (wherein) and further comprising a second filter pair formed by first and second sheets of filtering material substantially identical to said sheets forming said first filter pair, said second filter pair being disposed in spaced, generally parallel relation to said first filter pair to provide a dirty air channel between the facing surfaces of said first filter pair and said second filter pair, wherein said dimples in said facing surfaces of one of said pairs of sheets are offset from the dimples in the other of said pairs of sheets in a direction along the extending length thereof whereby the crevices formed by the dimples in one facing surface are not opposite the corresponding dimples in the other facing surface.

* * * * *